(12) United States Patent
Dröge et al.

(10) Patent No.: US 10,919,269 B2
(45) Date of Patent: Feb. 16, 2021

(54) COMPOSITE PANE COMPRISING A FUNCTIONAL ELEMENT HAVING ELECTRICALLY CONTROLLABLE OPTICAL PROPERTIES

(71) Applicant: SAINT-GOBAIN GLASS FRANCE, Courbevoie (FR)

(72) Inventors: Alicia Dröge, Herzogenrath (DE); Marcel Klein, Baesweiler (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/604,753

(22) PCT Filed: Feb. 28, 2018

(86) PCT No.: PCT/EP2018/054897
§ 371 (c)(1),
(2) Date: Oct. 11, 2019

(87) PCT Pub. No.: WO2018/188844
PCT Pub. Date: Oct. 18, 2018

(65) Prior Publication Data
US 2020/0061974 A1 Feb. 27, 2020

(30) Foreign Application Priority Data
Apr. 12, 2017 (EP) .................... 17166235

(51) Int. Cl.
*B32B 15/04* (2006.01)
*B32B 17/06* (2006.01)
(Continued)

(52) U.S. Cl.
CPC .... *B32B 17/10036* (2013.01); *B32B 17/1066* (2013.01); *B32B 17/10504* (2013.01);
(Continued)

(58) Field of Classification Search
CPC .......... B32B 17/10504; B32B 17/1066; G02F 1/1334; C03C 17/36; C03C 17/3681;
(Continued)

(56) References Cited

U.S. PATENT DOCUMENTS

| 5,408,353 A | 4/1995 | Nichols et al. |
| 6,074,732 A | 6/2000 | Garnier et al. |

(Continued)

FOREIGN PATENT DOCUMENTS

| DE | 202 20 494 U1 | 10/2003 |
| DE | 10 2005 007427 A1 | 8/2006 |

(Continued)

OTHER PUBLICATIONS

International Search Report as issued in International Patent Application No. PCT/EP2018/054897, dated May 24, 2018.

*Primary Examiner* — Lauren R Colgan
(74) *Attorney, Agent, or Firm* — Pillsbury Winthrop Shaw Pittman LLP

(57) ABSTRACT

A composite pane includes a functional element having electrically controllable optical properties, including a stack sequence formed of an outer pane, a first intermediate layer, a second intermediate layer, and an inner pane, wherein the intermediate layers contain at least one thermoplastic polymer film with at least one plasticizer, and a functional element having electrically controllable optical properties is arranged between the first intermediate layer and the second intermediate layer at least in sections, wherein between the first intermediate layer and the functional element as well as between the functional element and the second intermediate layer, at least one barrier film is arranged, which has, at least in sections, an overhang u beyond the functional element.

20 Claims, 8 Drawing Sheets

Figure 1A:
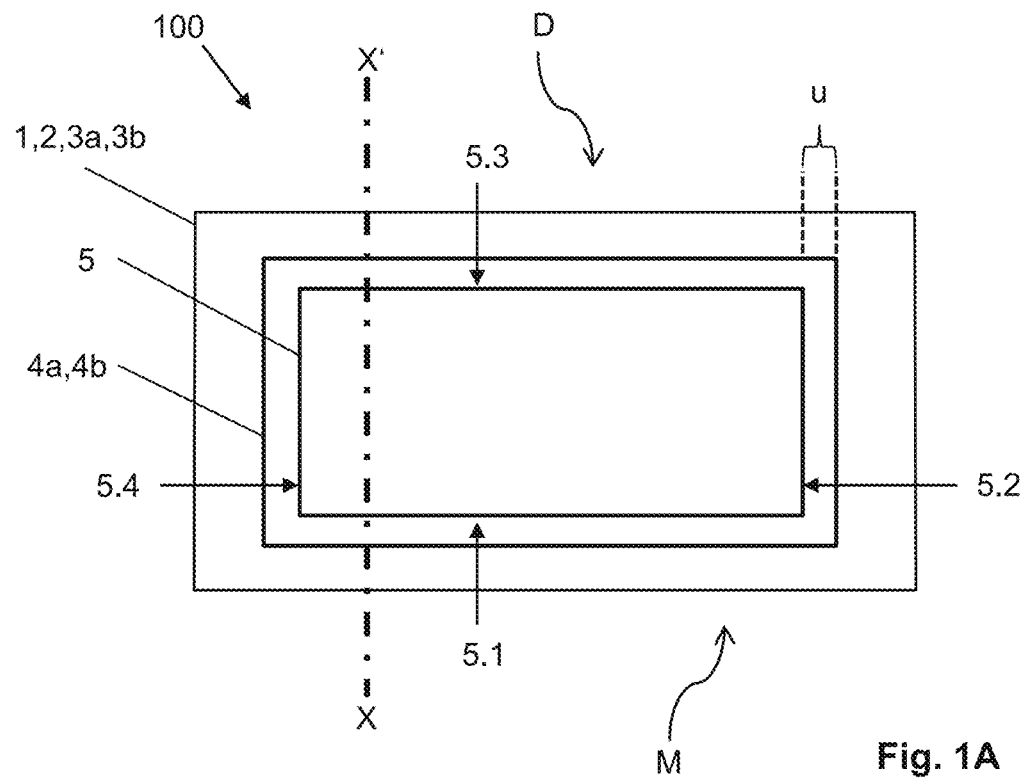

(51) Int. Cl.
  *B32B 17/10* (2006.01)
  *G02F 1/1334* (2006.01)
(52) U.S. Cl.
  CPC ........ *G02F 1/1334* (2013.01); *B32B 2250/03* (2013.01); *G02F 2201/501* (2013.01)
(58) Field of Classification Search
  CPC ..... C03C 17/3642; C03C 17/34; C03C 17/32; C03C 17/324; Y10T 428/31504; Y10T 428/12493; Y10T 428/24876; Y10T 428/24959; Y10T 428/2848; Y10T 428/2852; Y10T 428/31518
  USPC ........................................ 428/426, 428, 432
  See application file for complete search history.

(56) References Cited

U.S. PATENT DOCUMENTS

| | | | |
|---|---|---|---|
| 9,645,433 B2 * | 5/2017 | Mennig | B32B 17/10532 |
| 10,082,716 B2 * | 9/2018 | Mennig | B32B 17/10467 |
| 2002/0085151 A1 | 7/2002 | Faris et al. | |
| 2009/0115922 A1 | 5/2009 | Veerasamy | |
| 2009/0176101 A1 * | 7/2009 | Greenall | B32B 17/1077 |
| | | | 428/412 |
| 2010/0132988 A1 * | 6/2010 | Valentin | B32B 17/1077 |
| | | | 174/257 |
| 2010/0294366 A1 * | 11/2010 | Kanesato | B32B 17/10018 |
| | | | 136/263 |
| 2013/0050983 A1 * | 2/2013 | Labrot | C08K 5/1345 |
| | | | 362/84 |
| 2014/0192286 A1 * | 7/2014 | Tasaka | B32B 17/10504 |
| | | | 349/16 |
| 2014/0377580 A1 * | 12/2014 | Manz | C03C 17/3626 |
| | | | 428/623 |
| 2015/0298431 A1 * | 10/2015 | Von Der Weiden | |
| | | | B32B 17/10302 |
| | | | 428/76 |
| 2015/0301367 A1 * | 10/2015 | Mennig | G02F 1/1335 |
| | | | 359/245 |
| 2015/0301423 A1 * | 10/2015 | Orillard | B32B 37/182 |
| | | | 359/275 |
| 2016/0002100 A1 * | 1/2016 | Melcher | C03C 17/3649 |
| | | | 428/216 |
| 2016/0288460 A1 * | 10/2016 | Nakayama | B32B 17/1066 |
| 2018/0281570 A1 * | 10/2018 | Labrot | B32B 17/10339 |
| 2019/0033677 A1 * | 1/2019 | Letocart | G02F 1/155 |

FOREIGN PATENT DOCUMENTS

| | | |
|---|---|---|
| DE | 10 2005 049081 B3 | 6/2007 |
| DE | 10 2007 027296 A1 | 12/2008 |
| DE | 10 2013 001334 A1 | 7/2014 |
| EP | 1 954 488 A1 | 8/2008 |
| JP | H04-063424 U | 5/1992 |
| JP | H07-070218 A | 3/1995 |
| JP | H10-177390 A | 6/1998 |
| JP | 2016-504217 A | 2/2016 |
| KR | 10-2014-0130537 A | 11/2014 |
| KR | 10-2015-0092247 A | 8/2015 |
| WO | WO 2007/042716 A1 | 4/2007 |
| WO | WO 2007/122428 A1 | 11/2007 |
| WO | WO 2014/086555 A1 | 6/2014 |

* cited by examiner

COMPOSITE PANE COMPRISING A FUNCTIONAL ELEMENT HAVING ELECTRICALLY CONTROLLABLE OPTICAL PROPERTIES

CROSS-REFERENCE TO RELATED APPLICATIONS

This application is the U.S. National Stage of PCT/EP2018/054897, filed. Feb. 28, 2018, which in turn claims priority to European patent application number 17166235.6 filed Apr. 12, 2017. The content of these applications are incorporated herein by reference in their entireties.

The invention relates to a composite pane comprising a functional element having electrically controllable optical properties and in particular a windshield with an electrically controllable sun visor.

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or scattering properties of electromagnetic radiation in the visible range are electrically controllable. The functional elements are usually filmlike and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, the electrical control of the sun visor is more convenient than the manual folding down of the mechanical sun visor.

Windshields with such electrically controllable sun visors are, for example, known from WO 20141086555 A1, DE 102013001334 A1, DE 102005049081 B3, DE 102005007427 A1, and DE 102007027296 A1.

Typical electrically controllable functional elements contain electrochromic layer structures or single particle device (SPD) films. Further possible functional elements for realizing an electrically controllable sun screen are so-called PDLC functional elements (polymer dispersed liquid crystal). Their active layer contains liquid crystals that are embedded in a polymer matrix. When no voltage is applied, the liquid crystals are randomly oriented, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure protection against dazzling.

Prior art, laminated functional elements and, in particular, PLC functional elements often present, in the edge region, undesirable aging phenomena, such as brightening and changes in shading.

The object of the present invention is, consequently, to provide an improved composite pane with a functional element having electrically controllable optical properties that is improved, in particular, with regard to its aging resistance.

The object of the present invention is accomplished by a composite pane in accordance with the independent claim 1. Preferred embodiments emerge from the dependent claims.

A composite pane according to the invention comprises at least:

- a stack sequence formed of an outer pane, a first intermediate layer, a second intermediate layer, and einer inner pane, wherein the intermediate layers include, in each case, at least one thermoplastic polymer film with at least one plasticizer, and
- a functional element having electrically controllable optical properties is arranged between the first intermediate layer and the second intermediate layer at least in sections, wherein between the first intermediate layer and the functional element as well as between the functional element and the second intermediate layer, at least one barrier film is arranged, which has, at least in sections, an overhang u beyond the functional element.

Preferably, a barrier film is arranged in each case between the first intermediate layer and the functional element as well as between the functional element and the second intermediate layer, wherein each barrier film has, at least in sections, an overhang u beyond the functional element and overhanging sections of the barrier film are arranged immediately adjacent one another and contact one another. The terms "overhang" or "to overhang" mean, as generally commonly used: to protrude beyond something in a lateral (horizontal) direction. In this case, the barrier film protrudes in the plane of the functional element beyond the functional element. Here, "lateral" means as generally commonly used: to the side or sideways.

The overhang u according to the invention consequently differs from an overlapping region, in which the barrier film is, for example, arranged directly on a section of the top or bottom side of the functional element.

The composite pane can, for example, be the windshield or the roof panel of a vehicle or another vehicle glazing, for example, a separating pane in a vehicle, preferably in a rail vehicle or a bus. Alternatively, the composite pane can be an architectural glazing, for example, in an external façade of a building or a separating pane in a building.

The terms "outer pane" and "inner pane" arbitrarily describe two different panes. In particular, the outer pane can be referred to as "one first pane" and the inner pane as "one second pane".

When the composite pane is provided, in a window opening of a vehicle or of a building, to separate an interior from the external environment, "inner pane" refers, in the context of the invention, to the pane (second pane) facing the interior (vehicle interior). "Outer pane" refers to the pane (first pane facing the external environment. The invention is, however, not restricted to this.

The composite pane according to the invention includes a functional element having electrically controllable optical properties that is arranged, at least in sections, between a first intermediate layer and a second intermediate layer. The first and second intermediate layer customarily have the same dimensions as the outer pane and the inner pane. The functional element is preferably filmlike.

In an advantageous embodiment of a composite pane according to the invention, at least one barrier film is arranged in each case between the first intermediate layer and the second intermediate layer, which barrier film has an overhang u beyond the functional element on one side edge of the functional element, on two side edges of the functional element, on three side edges of the functional element, or on all sides (in other words on four or more side edges of the functional element). This means that one barrier film is arranged on the bottom side of the functional element and another barrier film is arranged on the top side of the functional element. In the region of the overhang, an overhanging region of one barrier film directly contacts an overhanging region of the second barrier film. With reference to a filmlike functional element, "bottom side" and "top side" mean the two large surfaces that are arranged parallel to the outer pane and the inner pane, in other words, the outer surface and the inner surface of the functional element. "Side edges" describes the surfaces of the functional element running orthogonal thereto, which, in filmlike functional elements, are very thin. The barrier films can cover the top side and/or the bottom side of the functional element in sections only or completely.

In another advantageous embodiment of a composite pane according to the invention, at least one one-piece barrier film is arranged between the first intermediate layer and the second intermediate layer, which barrier film is folded around one side edge of the functional element, at least in sections. In film like functional elements, "side edge" of the functional element is the side surface orthogonal to the bottom side and the top side. In a particularly advantageous embodiment of this composite pane according to the invention, the barrier film has, on one other side edge, on two other side edges, or on three or more other side edges, an overhang u beyond the functional element. In the region of the overhang, an overhanging region of the barrier film directly contacts an overhanging region of the barrier film that is folded around and guided back.

In another advantageous embodiment of a composite pane according to the invention, two, three, four, or more barrier films are arranged between the first intermediate layer and the second intermediate layer, which barrier films are folded around two, three, four, or more side edges of the functional element.

The one or more barrier films can cover the functional element in sections or completely.

In another advantageous embodiment of a composite pane according to the invention, two, three, four, or more barrier films are welded together and form a pocket, in which the functional element is arranged completely or in sections.

In an advantageous embodiment of a composite pane according to the invention, the overhang u of the barrier film beyond the functional element is at least 0.5 mm, preferably at least 2 mm, particularly preferably at least 5 mm, and in particular at least 10 mm. The overhang u is thus determined in its lateral dimension parallel to the two largest dimensions of the functional element or of the composite pane.

In an advantageous embodiment of a composite pane according to the invention, the overhang u of the barrier film beyond the functional element is less than 50 mm, preferably less than 30 mm, and particularly preferably less than 20 mm.

In another advantageous embodiment of a composite pane according to the invention, the barrier films or various regions of a barrier film are joined to one another in the region of the overhang, preferably pressed together (for example, by lamination in a composite pane), glued or welded (for example, by local heating). As a result, a sufficient and secure diffusion barrier against plasticizers from the intermediate layer is produced and clouding of the edge region of the functional element is reduced or prevented.

In another advantageous embodiment of a composite pane according to the invention, the barrier films or various regions of a folded barrier film are joined over their entire surface to the adjacent surfaces of the functional element and preferably glued, for example, by an adhesive, in particular by an acrylic-based adhesive, preferably acrylate-based, and most particularly preferably an adhesive that contains more than 50% methyl methacrylate. This has the particular advantage that slippage of the barrier film during assembly and during lamination is avoided and the barrier film is firmly and and fittingly joined to the functional element. As result, among other things, air inclusions between the barrier film and the functional element are avoided and the optical quality of such composite panes is particularly high.

In another advantageous embodiment of a composite pane according to the invention, the barrier films (or two regions of one folded-over barrier film) are not joined to the surfaces of the functional element, but, rather, only in the region of the overhang. Preferably, the barrier films are connected to one another in the region of the overhang only in sections such that during deaeration during the lamination process, air trapped between the barrier film and the functional element can escape and no air inclusions that reduce the quality of the composite pane remain.

The invention is based on the realization by the inventors that the diffusion of plasticizers out of the intermediate layers into the interior of the functional element during aging results in a brightening or a change in transmittance which impairs the through-vision and aesthetics of the composite pane. As a result of the sealing of the functional element with a barrier film, which impedes or prevents the diffusion of plasticizers out of the intermediate layer into the functional element and in particular into the side edge of the functional element, such aging phenomena are significantly reduced or completely prevented.

The sealing in the region of the side edge of the functional element is done either by a pocket-shaped barrier film that is folded around the side edge or by two barrier films (or two regions of one and the same barrier film), which are arranged directly adjacent one another, make a real contact with one another, and are pressed against one another (for example, by lamination in the interior of the composite pane), are glued (for example, with an adhesive), or are welded (for example, by local heating).

In an advantageous embodiment of a composite pane according to the invention, the intermediate layer contains a polymer, preferably a thermoplastic polymer.

In a particularly advantageous embodiment of a composite pane according to the invention, the intermediate layer contains at least 3 wt.-%, preferably at least 5 wt.-%, particularly preferably at least 20 wt.-%, even more preferably at least 30 wt.-%, and especially at least 40 wt.-% of a plasticizer. Preferably, the plasticizer contains or consists of triethylene glycol-bis-(2-ethyl hexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetra-ethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH$ $(CH_2CH_3)$ $CO$ $(OCH_2CH_2)_3O_2CCH$ $(CH_2CH_3)$ $C_4H_9$.

In another particularly advantageous embodiment of a composite pane according to the invention, the intermediate layer contains at least 60 wt.-%, preferably at least 70 wt.-%, particularly preferably at least 90 wt.-%, and especially at least 97 wt.-% polyvinyl butyral.

The thickness of each intermediate layer is preferably from 0.2 mm to 2 mm, particularly preferably from 0.3 mm to 1 mm, in particular from 0.3 mm to 0.5 mm, for example, 0.38 mm.

In an advantageous embodiment of a composite pane according to the invention, the barrier film is implemented such that it prevents the diffusion of plasticizers out of the intermediate layer through the barrier film.

In a particularly advantageous embodiment of a composite pane according to the invention, the barrier film is low in plasticizers, preferably with a plasticizer content of less than 3 wt.-%, particularly preferably of less than 1 wt.-%, and in particular of less than 0.5 wt.-%. Most particularly preferably, the barrier film is plasticizer-free, in other words, without deliberate addition of a plasticizer. The barrier film contains or consists of a polymer, preferably polyethylene terephthalate (PET) or polyvinyl fluoride (PVF). The barrier film can also contain low-plasticizer polyvinyl butyral (PVB) with a plasticizer content of less than 3 wt.-%.

The controllable functional element typically comprises an active layer between two surface electrodes. The active layer has the controllable optical properties that can be controlled via the voltage applied to the surface electrodes. The surface electrodes and the active layer are typically arranged substantially parallel to the surfaces of the outer pane and the inner pane. The surface electrodes are electrically connected to an external voltage source in a manner known per se. The electrical contacting is realized by means of suitable connecting cables, for example, foil conductors that are optionally connected to the surface electrodes via so-called busbars, for example, strips of an electrically conductive material or electrically conductive imprints.

The surface electrodes are preferably designed as transparent, electrically conductive layers. The surface electrodes preferably contain at least a metal, a metal alloy, or a transparent conductive oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 µm, particularly preferably from 20 nm to 1 µm, most particularly preferably from 30 nm to 500 nm.

The functional element can have, besides the active layer and the surface electrodes, other layers known per se, for example, barrier layers, blocking layers, antireflection layers, protective layers, and/or smoothing layers.

The functional element is preferably present as a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be processed advantageously. The functional element is advantageously protected by the carrier films against damage, in particular corrosion. The multilayer film contains, in the order indicated, at least one carrier film, one surface electrode, one active layer, another surface electrode, and another carrier film. The carrier film carries, in particular, the surface electrodes and gives a liquid or soft active layer the necessary mechanical stability.

The carrier films preferably contain at least one thermoplastic polymer, particularly preferably low-plasticizer or plasticizer-free polyethylene terephthalate (PET). This is particularly advantageous in terms of the stability of the multilayer film. The carrier films can, however, also contain or be made of other low-plasticizer or plasticizer-free polymers, for example, ethylene vinyl acetate (EVA), propylene, polycarbonate, polymethyl methacrylate, polyacrylate, polyvinyl chloride, polyacetate resin, casting resins, acrylates, fluorinated ethylene propylenes, polyvinyl fluoride. and/or ethylene-tetrafluoroethylene. The thickness of each carrier film is preferably from 0.1 mm to 1 mm, particularly preferably from 0.1 mm to 0.2 mm.

Typically, the carrier films have in each case an electrically conductive coating that faces the active layer and acts as a surface electrode.

In another advantageous embodiment of a composite pane according to the invention, the functional element is a PDLC functional element (polymer dispersed liquid crystal). The active layer of a PDLC functional element contains liquid crystals that are embedded in a polymer matrix. When no voltage is applied on the surface electrodes, the liquid crystals are randomly oriented, resulting in strong scattering of the light passing through the active layer. When a voltage is applied on the surface electrodes, the liquid crystals align in a common direction and the transmittance of light through the active layer is increased.

In principle, however, it is also possible to use other types of controllable functional elements, for example, electrochromic functional elements or SPD functional elements (suspended particle device). The controllable functional elements mentioned and their mode of operation are known per se to the person skilled in the art such that a detailed description can be dispensed with at this point.

Functional element as multilayer films are commercially available. The functional element to be integrated is typically cut out of a multilayer film of relatively large dimensions in the desired shape and size. This can be done mechanically, for example, with a knife. In an advantageous embodiment, the cutting is done using a laser. It has been demonstrated that, in this case, the side edge is more stable than with mechanical cutting. With mechanically cut side edges, there can be a risk that the material pulls back, which is visually conspicuous and adversely affects the aesthetics of the pane.

The functional element is joined to the outer pane via a region of the first intermediate layer and to the inner pane via a region of the second intermediate layer. The intermediate layers are preferably a really arranged one atop another and laminated to one another, with the functional element inserted between the two layers. The regions of the intermediate layers overlapping the functional element then form the regions that join the functional element to the panes. In other regions of the pane where the intermediate layers are in direct contact with one another, they can fuse during lamination such that the two original layers are possibly no longer discernible and there is, instead, one homogeneous intermediate layer.

An intermediate layer can, for example, be formed by a single thermoplastic film. An intermediate layer can also be formed as a two layer, three layer, or multilayer film stack, wherein the individual films have the same or different properties. An intermediate layer can also be formed from sections of different thermoplastic films having adjacent side edges.

In an advantageous development of a composite pane according to the invention, the region of the first or the second intermediate layer, via which the functional element is joined to the outer pane or to the inner pane, is tinted or colored. The transmittance of this region in the visible spectral range is thus reduced compared to a non-tinted or non-colored layer. The tinted/colored region of the intermediate layer thus reduces the transmittance of the windshield in the region of the sun visor. In particular, the aesthetic impression of the functional element is improved because the tinting results in a more neutral appearance, which has a more pleasant effect on the viewer.

In the context of the invention, "electrically controllable optical properties" means properties that are infinitely controllable but also those that can be switched between two or more discrete states.

The electrical control of the sun visor is done, for example, using switches, rotary knobs, or sliders that are integrated into the dashboard of the vehicle. However, a switch area for controlling the sun visor can also be integrated into the windshield, for example, a capacitive switch area. Alternatively, or additionally, the sun visor can be controlled by contactless methods, for example, by gesture recognition, or as a function of the pupil or eyelid state detected by a camera and suitable evaluation electronics. Alternatively, or additionally, the sun visor can be controlled by sensors that detect light incidence on the pane.

The tinted or colored region of the intermediate layer preferably has transmittance in the visible spectral range from 10% to 50%, particularly preferably from 20% to 40%. With that, particularly good results are achieved in terms of glare protection and visual appearance.

The intermediate layer can be formed by a single thermoplastic film, wherein the tinted or colored region is produced by local tinting or coloring. Such films can be obtained, for example, by coextrusion. Alternatively, a non-tinted film section and a tinted or colored film section can be combined to form the thermoplastic layer.

The tinted or colored region can be homogeneously colored or tinted, in other words, can have location-independent transmittance. The tinting or coloring can, however, be inhomogeneous, in particular a transmittance profile can be realized. In one embodiment, the transmittance level decreases in the tinted or colored region, at least in sections, with increasing distance from the upper edge. Thus, sharp edges of the tinted or colored area can be avoided such that the transition from the sun visor into the transparent region of the windshield is gradual, appearing aesthetically more attractive.

In an advantageous embodiment, the region of the first intermediate layer, i.e., the region between the functional element and the outer pane is tinted. This gives a particularly aesthetic impression when the outer pane is viewed from above. The region of the second intermediate layer between the functional element and the inner pane can, optionally, be additionally colored or tinted.

The composite pane having an electrically controllable functional element can advantageously be implemented as a windshield with an electrically controllable sun visor.

Such a windshield has an upper edge and a lower edge as well as two side edges extending between the upper edge and the lower edge. "Upper edge" refers to that edge that is intended to point upward in the installation position. "Lower edge" refers to that edge that is intended to point downward in the installation position. The upper edge is often referred to as the "roof edge"; the lower edge as the "engine edge".

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The functional element is advantageously arranged above the central field of vision (field of vision B). This means that the functional element is arranged in the region between the central field of vision and the upper edge of the windshield. The functional element does not have to cover the entire area, but is positioned completely within this area, and does not protrude into the central field of vision. In other words, the functional element is less distant from the upper edge of the windshield than the central field of vision. Thus, the transmittance of the central field of vision is not affected by the functional element which is positioned in a location similar to that of a conventional mechanical sun visor in the folded-down state.

The windshield is preferably provided for a motor vehicle, particularly preferably for passenger car.

In a preferred embodiment, the functional element, more precisely the side edges of the functional element are circumferentially surrounded by a third intermediate layer. The third intermediate layer is designed like a frame with a recess into which the functional element is inserted. The third intermediate layer can also be formed by a thermoplastic film into which the recess is introduced by cutting. Alternatively, the third intermediate layer can also be composed of a plurality of film sections around the functional element. The intermediate layer is preferably formed from a total of at least three thermoplastic layers arranged areally atop one another, wherein the middle layer has a recess in which the functional element is arranged. During production, the third intermediate layer is arranged between the first and the second intermediate layer, with the side edges of all intermediate layers preferably arranged congruently. The third intermediate layer preferably has approx. the same thickness as the functional element. Thus, the local difference in thickness of the windshield, which is introduced by the locally limited functional element, is compensated such that glass breakage during lamination can be avoided.

The side edges of the functional element visible when looking through the windshield are preferably arranged flush with the third intermediate layer such that no gap exists between the side edge of the functional element and the associated side edge der intermediate layer. This is in particular true for the lower edge of the functional element, which is typically visible. Thus, the boundary between the third intermediate layer and the functional element is visually less noticeable.

In a preferred embodiment, the lower edges of the functional element and of the tinted region of the intermediate layer(s) are adapted to the shape of the upper edge of the windshield, yielding a more appealing visual impression. Since the upper edge of a windshield is typically curved, in particular concavely curved, the lower edge of the functional element and of the tinted region is also preferably curved. Particularly preferably, the lower edges of the functional element are substantially parallel to the upper edge of the windshield. It is, however, also possible to construct the sun visor from two halves, each straight, arranged at an angle relative to one another, and forming a virtually V-shaped upper edge.

In one embodiment of the invention, the functional element is divided into segments by isolation lines. The isolation lines are in particular introduced into the surface electrodes such that the segments of the surface electrode are isolated from one another. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of extension that, in a windshield, runs between the side edges of the windshield. The isolation lines do not necessarily have to be straight, but can also be slightly curved, preferably adapted to possible curvature of the upper edge of the windshield, in particular substantially parallel to the upper edge of the windshield. Vertical isolation lines are, of course, also conceivable.

The isolation lines have, for example, a width of 5 µm to 500 µm, in particular 20 µm to 200 µm. The width of the segments, i.e., the distance between adjacent isolation lines can be suitably selected by the person skilled in the art according to the requirements of the individual case.

The isolation lines can be introduced by laser ablation, mechanical cutting, or etching during production of the functional element. Already laminated multilayer films can also be subsequently segmented by laser ablation.

The upper edge and the side edges or all side edges of the functional element are concealed in vision through the composite pane preferably by an opaque masking print or by an outer frame. Windshields typically have a circumferential peripheral masking print made of an opaque enamel, which serves in particular to visually conceal the adhesive used for installation of the window and to protect it against UV radiation. This peripheral masking print is preferably used to also conceal the upper edge and the side edge of the functional element as well as the necessary electrical connections. The sun visor is then advantageously integrated into the appearance of the windshield and only its lower edge is potentially discernible to the observer. Preferably, both the outer pane and also the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors. It is also possible to realize the sun visor with at least two functional elements separated from one another, with a distance between the functional elements providing space for a sensor window or a camera window.

The functional element (or the totality of the functional elements in the above-described case of a plurality of functional elements) is preferably arranged over the entire width of the composite pane or of the windshield, minus an edge region on both sides having the width of, for example, 2 mm to 20 mm. The functional element also preferably has a distance of, for example, 2 mm to 20 mm from the upper edge. The functional element is thus encapsulated within the intermediate layer and protected against contact with the surrounding atmosphere and corrosion.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention also includes a method for producing a composite pane according to the invention, wherein at least
a) one outer pane, one first intermediate layer, one functional element having electrically controllable optical properties, one second intermediate layer, and one inner pane are arranged one atop another in this order, wherein a barrier film is arranged between the functional element and the intermediate layer,
b) the outer pane and the inner pane are joined by lamination, wherein an intermediate layer with an embedded functional element is formed from the first intermediate layer and the second intermediate layer.

The electrical contacting of the surface electrodes of the functional element is preferably done before the lamination of the composite pane.

Any prints that are present, for example, opaque masking prints or printed busbars for the electrical contacting contacting of the functional element are preferably applied by screen printing.

The lamination is preferably done under the action of heat, vacuum, and/or pressure. Methods known per se can be used for lamination, for example, autoclave methods, vacuum bag methods, vacuum ring methods, calender methods, vacuum laminators, or combinations thereof.

In an advantageous embodiment of the method according to the invention, before step a), a first barrier film and the first intermediate layer and/or a second barrier film and the second intermediate layer are glued to one another, for example, with an acrylic or acrylate adhesive. Such fixed barrier films can be more easily and more precisely processed, in particular with automation.

The invention further includes the use of a composite pane according to the invention having an electrically controllable functional element as interior glazing or exterior glazing in a vehicle or a building, wherein the electrically controllable functional element is used as a sun screen or as a privacy screen.

The invention further includes the use of a composite pane according to the invention as a windshield or roof panel of a vehicle, wherein the electrically controllable functional element is used as a sun visor.

A major advantage of the invention, with composite panes as a windshield, consists in that a conventional vehicle-roof-mounted, mechanically foldable sun visor can be dispensed with. Consequently, the invention also includes a vehicle, preferably a motor vehicle, in particular a passenger car, that has no such conventional sun visor.

The invention also includes the use of a tinted or colored region of an intermediate layer for joining a functional element having electrically controllable optical properties with an outer pane or an inner pane of the windshield, wherein an electrically controllable sun visor is realized by means of the tinted or colored region of the intermediate layer and the functional element.

Figure 1B:
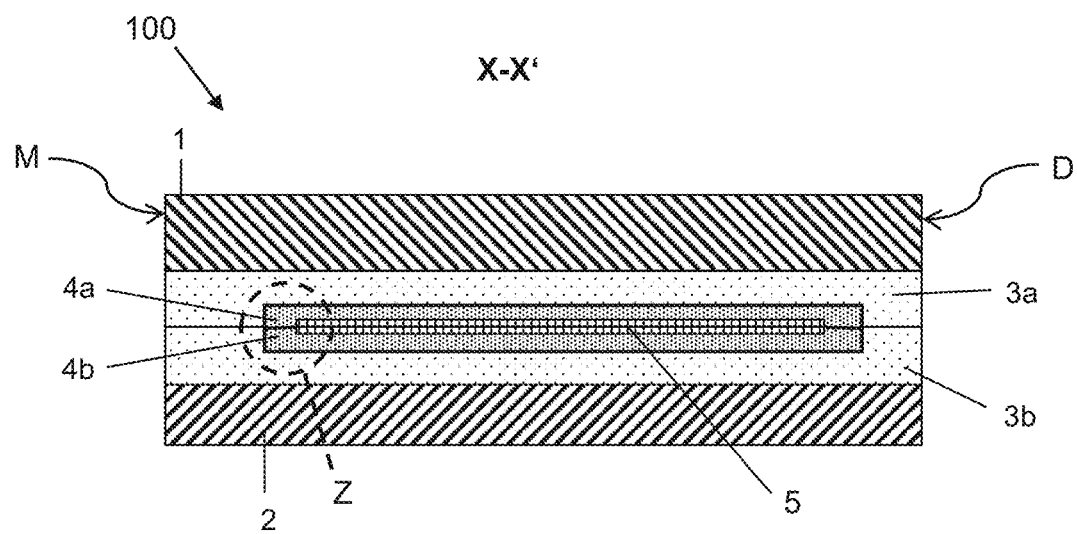
Figure 1C:
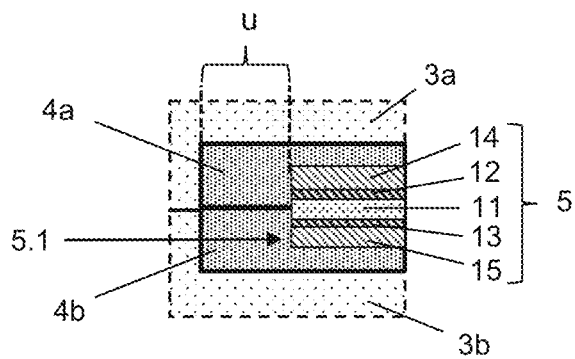
Figure 2:
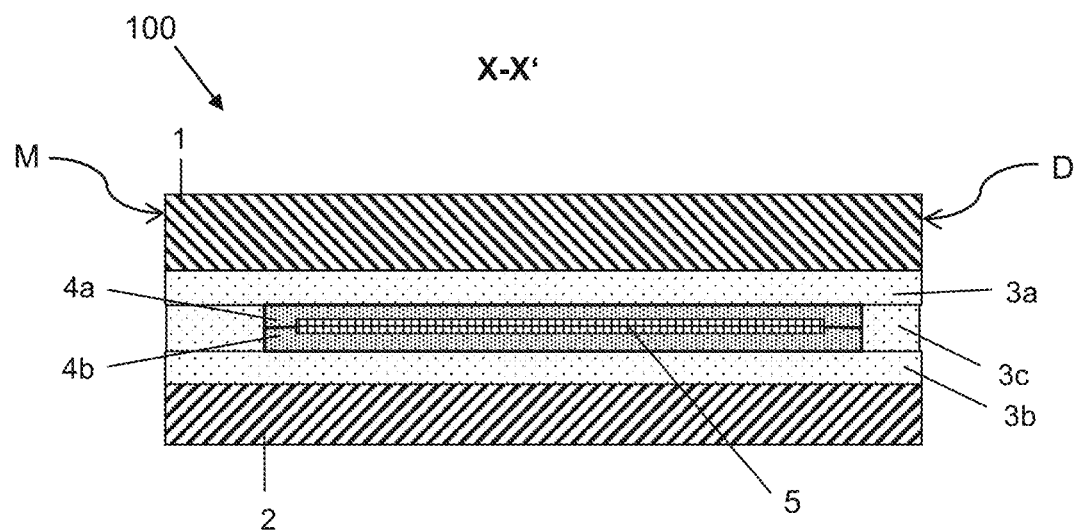
Figure 3A:
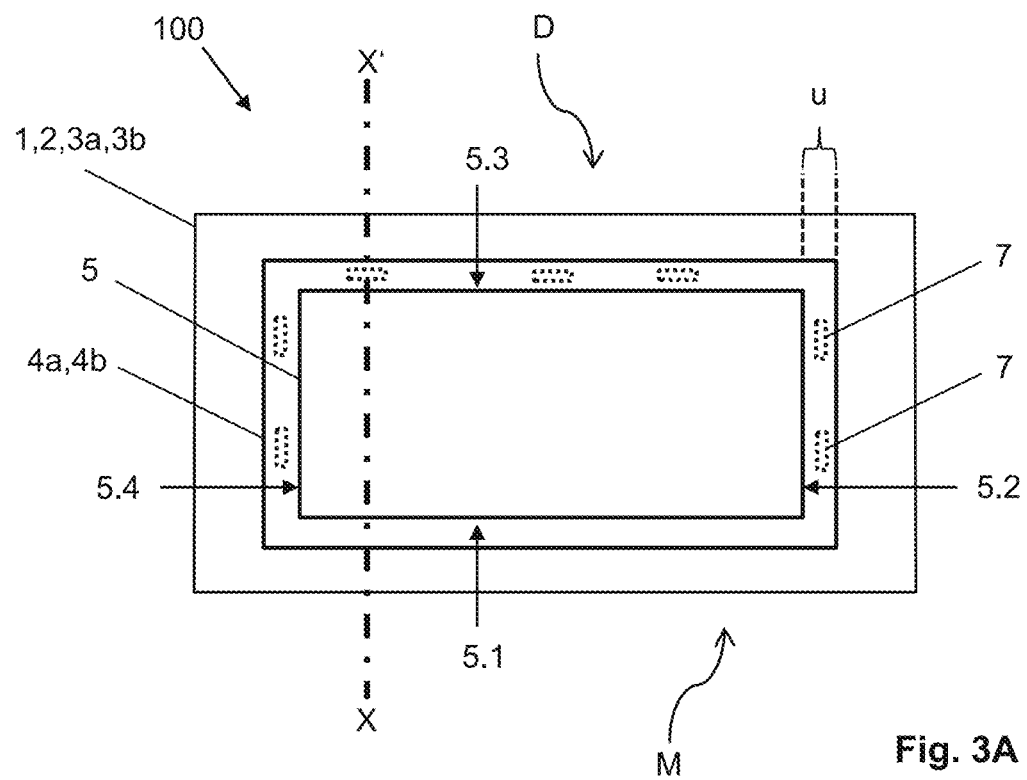
Figure 3B:
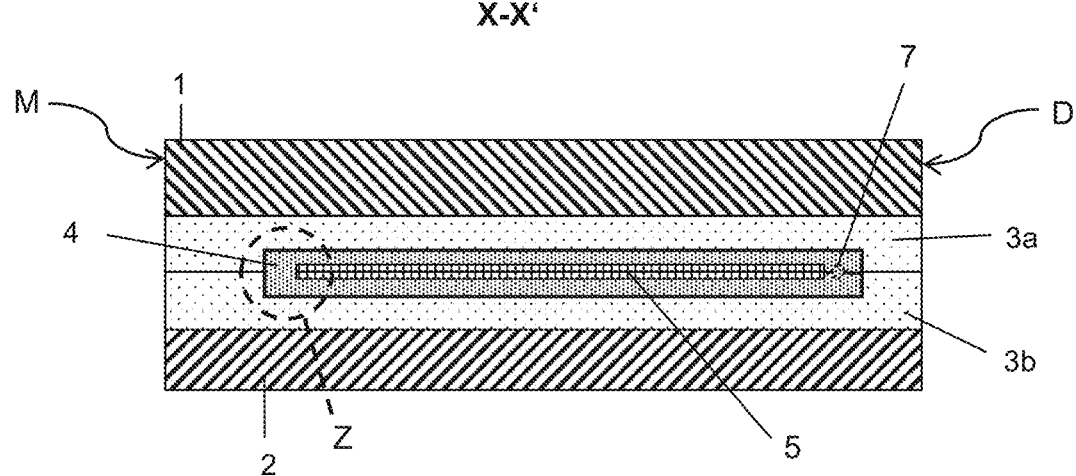
Figure 3C:
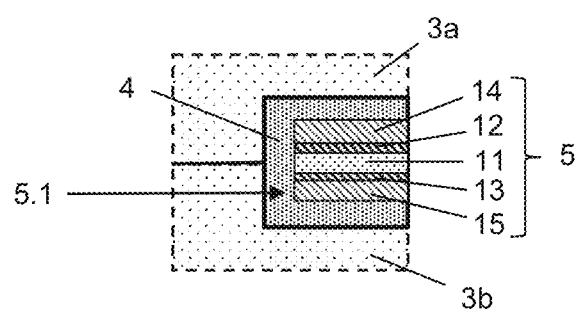
Figure 3D:
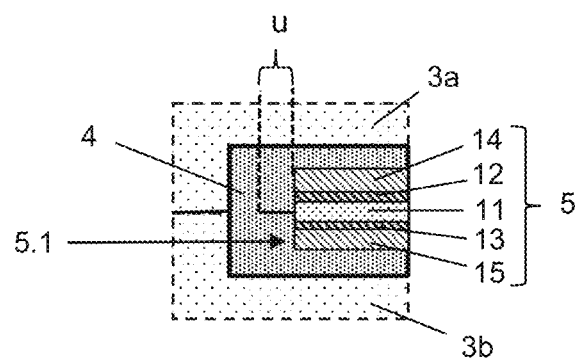
Figure 4:
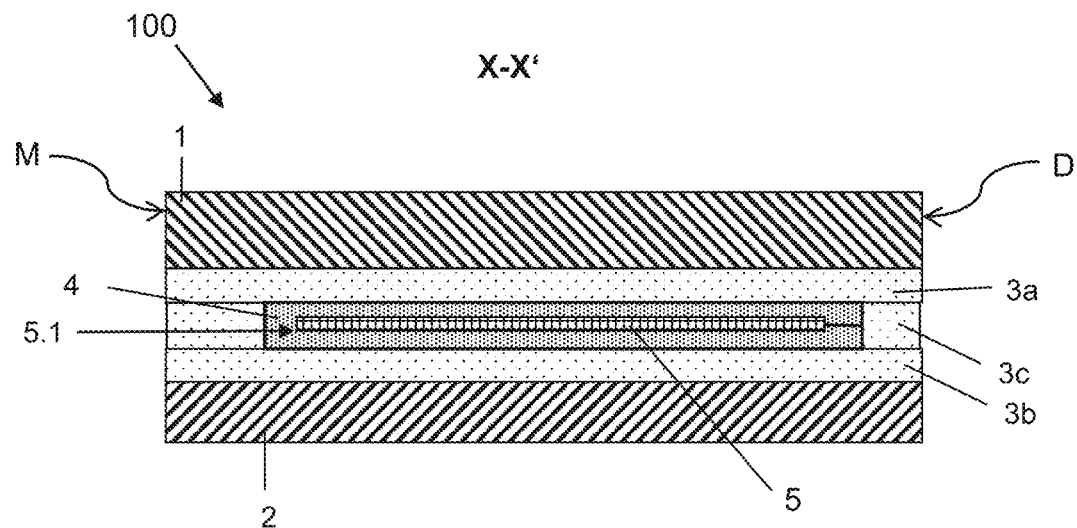
Figure 8:
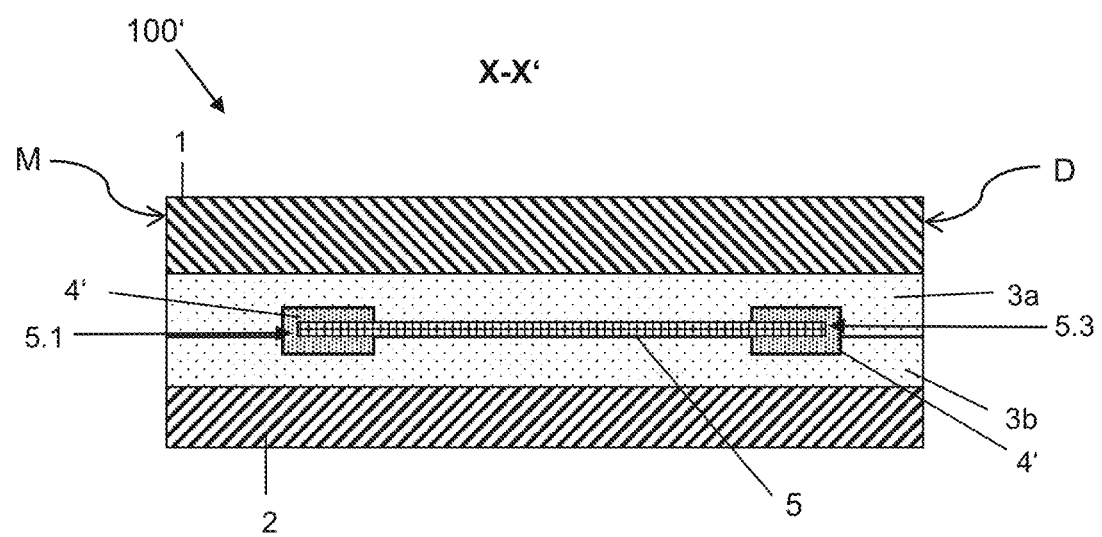
Figure 5A:
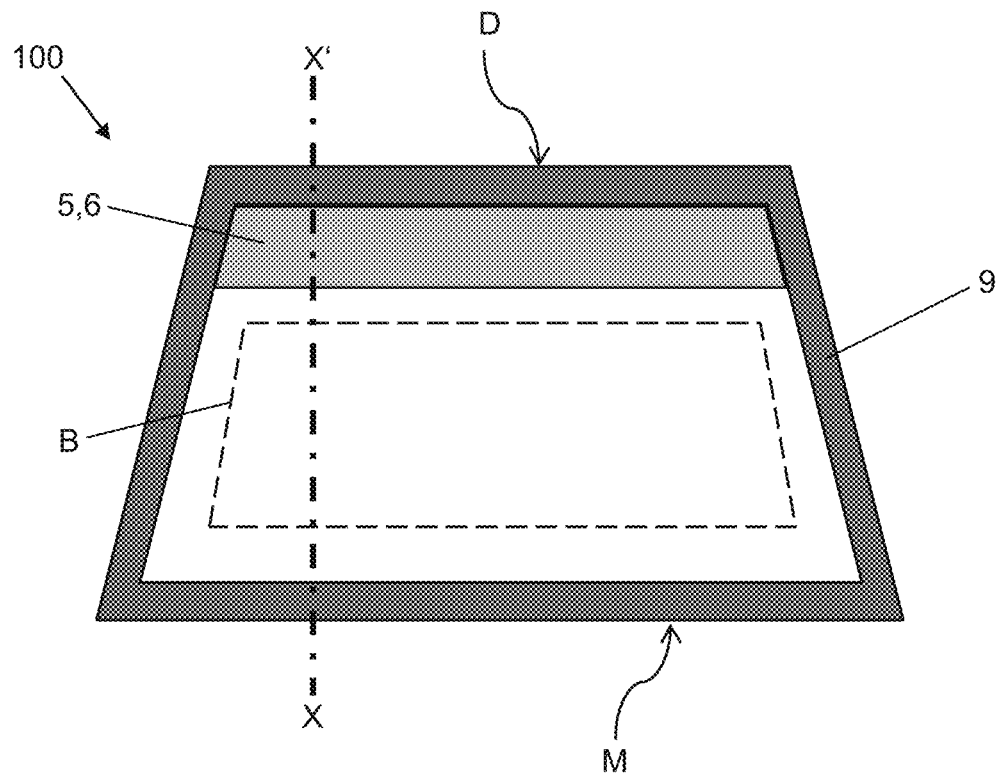
Figure 5B:
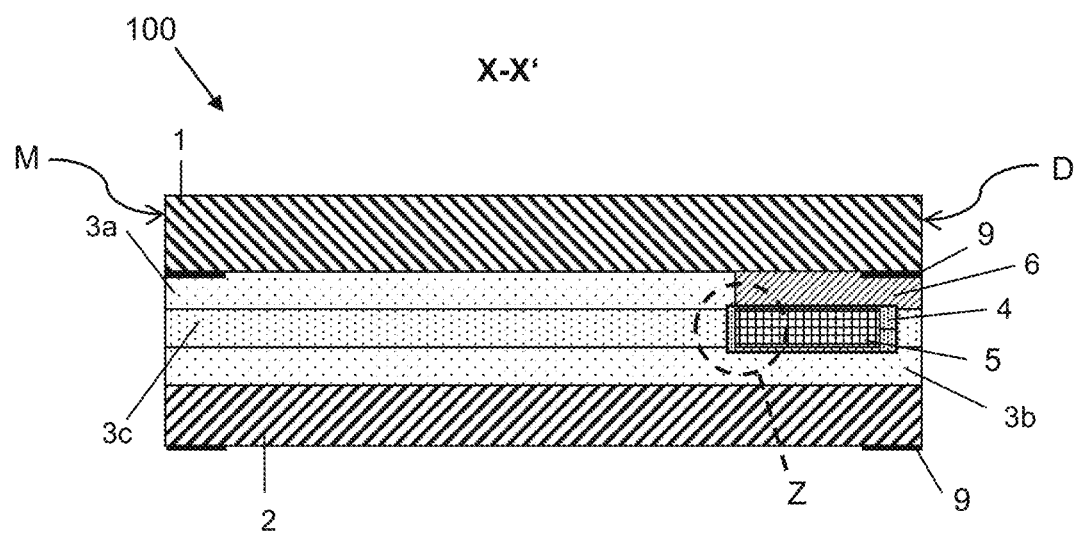
Figure 5C:
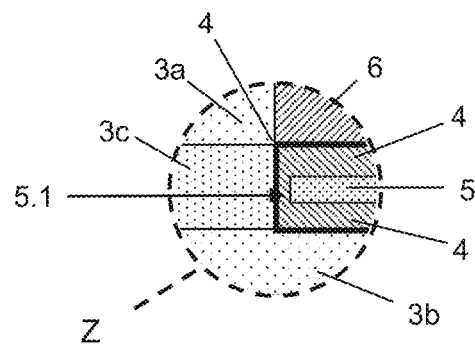
Figure 6:
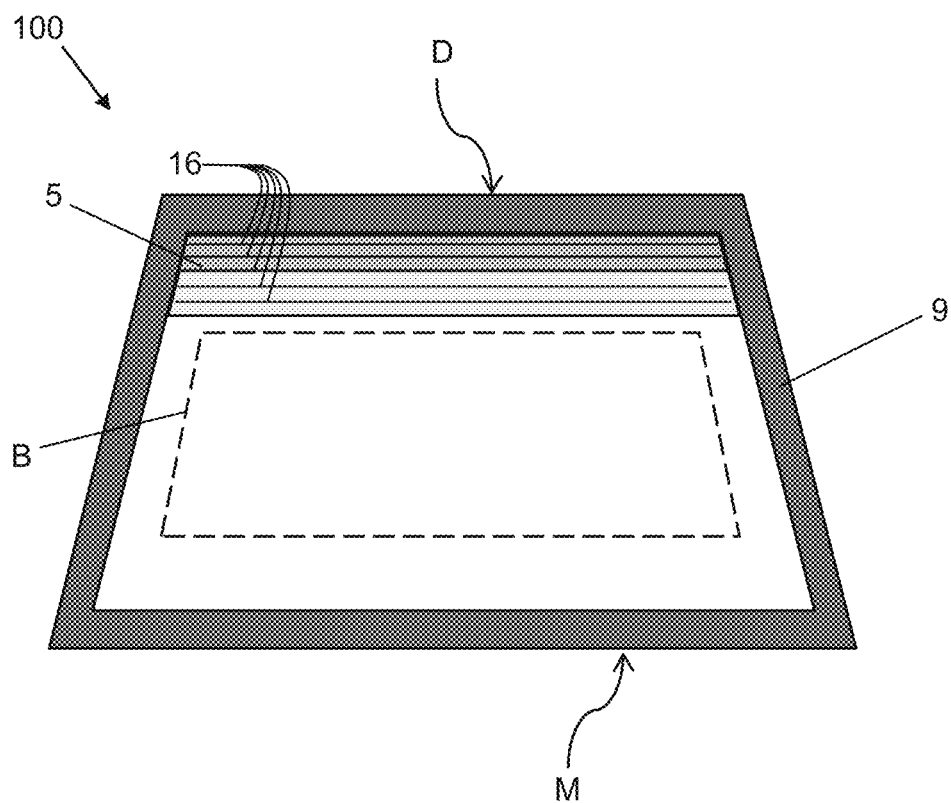
Figure 7:
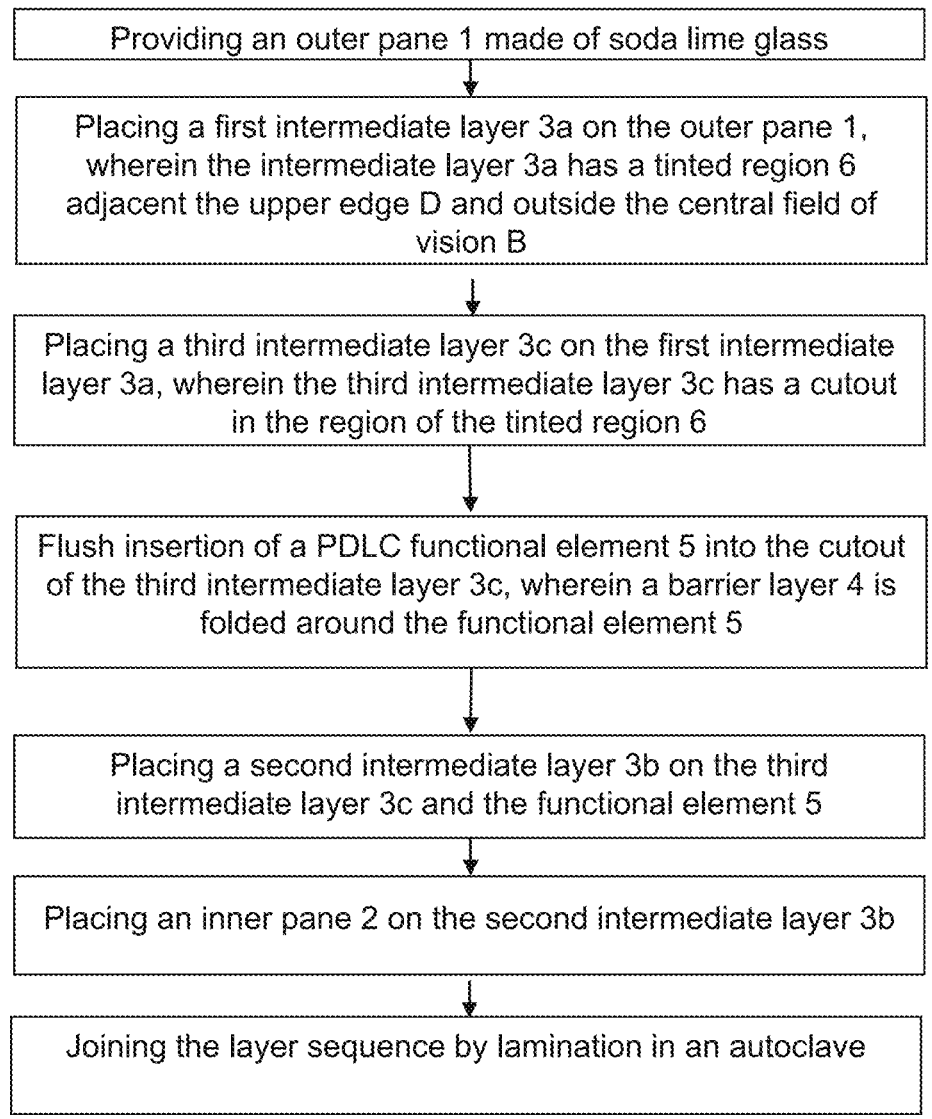

The invention is explained in detail with reference to drawings and exemplary embodiments. The drawings are schematic representations and not true to scale. The drawings in no way restrict the invention. They depict:

FIG. 1A a plan view of a first embodiment of a composite pane according to the invention, FIG. 1B a cross-section through the composite pane of FIG. 1A along the section line X-X', FIG. 1C an enlarged view of the region Z of FIG. 1B, FIG. 2 a cross-section through a development of a composite pane according to the invention, FIG. 3A a plan view of another embodiment of a composite pane according to the invention, FIG. 3B a cross-section through the composite pane of FIG. 3A along the section line X-X', FIG. 3C an enlarged view of the region Z of FIG. 3B, FIG. 3D an enlarged view of the region Z of an alternative embodiment according to the invention of FIG. 3B, FIG. 4 a cross-section through a development of a composite pane according to the invention, FIG. 5A a plan view of another embodiment of a composite pane according to the invention as a windshield with a sun visor, FIG. 5B a cross-section through the composite pane of FIG. 5A along the section line X-X', FIG. 5C an enlarged view of the region Z of FIG. 5B, FIG. 6 a plan view of another embodiment of a composite pane according to the invention as a windshield with a sun visor, FIG. 7 an exemplary embodiment of the method according to the invention with reference to a flowchart, and FIG. 8 as a comparative example, a cross-section through a prior art composite pane.

FIG. 1A, FIG. 1B, and FIG. 1C depict in each case a detail of a composite pane 100 according to the invention. The composite pane 100 comprises an outer pane 1 and an inner pane 2 that are joined to one another via a first intermediate layer 3a and a second intermediate layer 3b. The outer pane 1 has a thickness of 2.1 mm and is made, for example, of a clear soda lime glass. The inner pane 2 has a thickness of 1.6 mm and is also made, for example, of a clear soda lime glass. The composite pane 100 has a first edge referenced with D that is called the "upper edge" in the following. The composite pane 100 has a second edge referenced with M that is arranged opposite the upper edge D and is called the "lower edge" in the following. The composite pane 100 can be arranged, for example, as architectural glazing in the frame of a window with other panes to form an insulating glazing unit.

A functional element 5 that is controllable in its optical properties via an electrical voltage is arranged between the first intermediate layer 3a and the second intermediate layer 3b. For the sake of simplicity, the electrical leads are not shown.

The controllable functional element 5 is, for example, a PDLC multilayer film consisting of an active layer 11 between two surface electrodes 12, 13 and two carrier films 14, 15. The active layer 11 contains a polymer matrix with liquid crystals dispersed therein that are oriented as a function of the electrical voltage applied on the surface electrodes, by which means the optical properties can be controlled. The carrier films 14, 15 are made of PET and have a thickness of, for example, 0.125 mm. The carrier films 14, 15 are provided with a coating of ITO facing the active layer 11 and having a thickness of approx. 100 nm which form the surface electrodes 12, 13. The surface electrodes 12, 13 can be connected to the vehicle's electrical system via busbars (not shown) (formed, for example, by a silver-containing screen print) and connection cables (not shown).

The intermediate layers 3a, 3b comprise in each case a thermoplastic film with a thickness of 0.38 mm. The intermediate layers 3a, 3b are made, for example, of 78 wt.-% polyvinyl butyral (PVB) and 20 wt.-% triethylene glycol bis(2-ethyl hexanoate) as plasticizer.

A barrier film 4a is arranged between the first intermediate layer 3a and the functional element 5. Furthermore, another barrier film 4b is arranged between the functional element 5 and the second intermediate layer 3b. The barrier films 4a, 4b have here, for example, an all-around overhang u of, for example, 5 mm beyond the functional element 5. Here, "all-around" means that there is an overhang u over each side edge 5.1, 5.2, 5.3, 5.4 of the functional element 5. In the region of the overhang, sections of the barrier film 4a make contact with directly opposing sections of the barrier film 4b. By means of the all-around overlap, the functional element 5 is completely surrounded and sealed by barrier film 4a, 4b.

The barrier film 4a, 4b is made here, for example, substantially of PET, in other words up to at least 97 wt.-%. The barrier film 4a, 4b contains less than 0.5 wt.-% plasticizer and is suitable for reducing or preventing the diffusion of plasticizer out of the intermediate layers 3a, 3b over the side edges 5.1, 5.2, 5.3, 5.4 into the functional layer 5.

In aging tests, such composite panes 100 present a significantly reduced brightening in the edge region of the functional element 5, since diffusion of the plasticizer out of the intermediate layers 3a, 3b into the functional element 5 and a resulting degradation of the functional element 5 is avoided.

In an advantageous development of the composite pane 100 according to the invention, an adhesive means, for example, an acrylate-based adhesive, that adherently glues the barrier films 4a, 4b to the adjacent carrier films 14, 15 or to the opposing barrier film 4a, 4b is arranged between the barrier film 4a and the functional element 5, between the barrier film 4b and the functional element 5 and the sections of the barrier films 4a, 4b making contact with one another. The adhesive connection prevents slippage of the barrier film 4a, 4b during assembly. At the same time, inclusions of air bubbles and resultant visual distractions or impairments are avoided since the barrier film 4a, 4b rests uniformly on the functional element 5.

FIG. 2 depicts a development of the composite pane 100 according to the invention of FIG. 1A-C. The composite pane 100 of FIG. 2 corresponds substantially to the composite pane 100 of FIG. 1A-C such that, in the following, only the differences will be discussed.

In this embodiment, another, third intermediate layer 3c is arranged in sections between the first intermediate layer 3a and the second intermediate layer 3b. The third intermediate layer 3c is made, for example, from the same material as the first and the second intermediate layer 3a, 3b. The third intermediate layer has a cutout, into which the functional element 5 with the barrier films 4a, 4b is inserted with a precise fit, in other words, flush on all sides. The third intermediate layer 3c thus forms a sort of universal frame for the functional element 5. By means of the third intermediate layer 3c, the differences in thickness that result from the material thicknesses of the functional element 5 and the barrier film 4a, 4b can be compensated.

FIG. 3A, FIG. 3B, and FIG. 3C depict in each case a detail of an alternative composite pane 100 according to the invention. The composite pane 100 of FIG. 3A-C corresponds substantially to the composite pane 100 of FIG. 1A-C such that, in the following, only the differences will be discussed.

In contrast to FIG. 1A-C, in the composite pane 100 of FIG. 3A-C, the barrier film 4 is one piece and is folded around a side edge 5.1 of the functional element 5 (here, the side edge 5.1 of the functional element 5 directly adjacent the edge M of the composite pane 100). Here, "folded" means that the barrier film 4 is turned 180° and arranged parallel to itself. The functional element 5 is arranged in the intermediate space thus formed. On all other side edges 5.2, 5.3, 5.4 of the functional element 5, the barrier film 4 has an overhang u of, for example, 10 mm.

In an advantageous development of the composite pane 100 according to the invention, an adhesive means, for example, an acrylate-based adhesive, that adherently glues the barrier films 4 to the adjacent carrier films 14, 15 or to the opposing barrier film 4 is arranged between the barrier film 4 and the functional element 5 and the sections of the barrier films 4 making contact with one another. The adhesive connection prevents slippage of the barrier film 4 during assembly. At the same time, inclusions of air bubbles and resultant visual distractions or impairments are avoided since the barrier film 4 rests uniformly on the functional element 5.

As an alternative to the adhesive means, the two layers or sections of the barrier film 4 can be glued to one another or fused with one another, for example, by local heating with a hot object, such as a soldering iron or the like, only in the region of the overhang. Here, it is advantageous for the gluing or fusing to be done only in sections, for example, at the connection sites 7 such that air enclosed between the barrier film 4 and the functional element 5 can escape during lamination and no air bubbles impair the optical properties of the composite pane 100 in the region of the functional element 5.

FIG. 3D depicts an enlarged view of the region Z of an alternative embodiment of the invention of FIG. 3B. In this exemplary embodiment, similarly as in FIG. 3C, the barrier film 4 is one piece and folded around a side edge 5.1 of the functional element 5 (here, the side edge 5.1 of the functional element 5 directly adjacent the edge M of the composite pane 100). The fold is, however, not closely positioned and guided directly along the side edge 5.1, but, instead, forms an overhanging region, in which the upper layer of the barrier film 4 and the lower layer of the barrier film 4 make contact with one another. The overhang $u_1$ here is, for example, 5.5 mm. On all other side edges 5.2, 5.3, 5.4 of the functional element 5, the barrier film 4 has an overhang u of, for example, 10 mm.

FIG. 4 depicts a development of the composite pane 100 according to the invention of FIG. 3A-C. The composite pane 100 of FIG. 4 corresponds substantially to the composite pane 100 of FIG. 3A-C such that, in the following, only the differences will be discussed.

Analogously to FIG. 2, in this embodiment, another, third intermediate layer 3c is arranged in sections between the first intermediate layer 3a and the second intermediate layer 3b. The third intermediate layer 3c is made, for example, of the same material as the first and the second intermediate layer 3a, 3b. The third intermediate layer has a cutout, into which the functional element 5 with the folded-around barrier film 4 is inserted with a precise fit, in other words, flush on all sides. The third intermediate layer 3c thus forms a sort of universal frame for the functional element 5. By means of the third intermediate layer 3c, the differences in thickness that result from the material thicknesses of the functional element 5 and the barrier film 4 can be compensated.

FIG. 5A, FIG. 5B, and FIG. 5C depict in each case a detail of an alternative composite pane 100 according to the invention as a windshield with an electrically controllable sun visor. The composite pane 100 of FIG. 5A-C corresponds substantially to the composite composite 100 of FIG. 1A-C such that, in the following, only the differences will be discussed.

The windshield comprises a trapezoidal composite pane 100 with an outer pane 1 and an inner pane 2 that are joined to one another via two intermediate layers 3a, 3b. The outer pane 1 has a thickness of 2.1 mm and is made of a green colored soda lime glass. The inner pane 2 has a thickness of 1.6 mm and and is made of a clear soda lime glass. The windshield has an upper edge D facing the roof in the installation position and a lower edge M facing the engine compartment in the installation position.

The windshield is equipped with an electrically controllable functional element 5 as a sun visor that is arranged in a region above the central field of vision B (as defined in ECE-R43). The sun visor is formed by a commercially available PDLC multilayer film as a functional element 5 that is embedded in the intermediate layers 3a, 3b. The height of the sun visor is, for example, 21 cm. The first intermediate layer 3a is joined to the outer pane 1; the second intermediate layer 3b is joined to the inner pane 2. A third intermediate layer 3c positioned therebetween has a cutout, into which the PDLC multilayer cut to size is inserted with precise fit, in other words, flush on all sides. The third intermediate layer 3c thus forms, so to speak, a sort of universal frame for the functional element 5, which is thus encapsulated all around in a thermoplastic material and is protected thereby.

The first intermediate layer 3a has a tinted region 6 that is arranged between the functional element 5 and the outer pane 1. The light transmittance of the windshield is thus additionally reduced in the region of the functional element 5 and the milky appearance of the PDLC functional element 5 is mitigated in the diffusive state. The aesthetics of the windshield are thus designed significantly more appealing. The first intermediate layer 3a has in the region 6, for example, an average light transmittance of 30%, with which good results are obtained.

The region 6 can be homogeneously tinted. However, it is often more visually appealing for the tinting to decrease in the direction of the lower edge of the functional element 5 such that the tinted and non-tinted region translation smoothly into one another.

In the case depicted, the lower edges of the tinted region 6 and the lower edge of the PDLC functional element 5 (here, its side edge 5.1) are arranged flush with the barrier film 4. However, this is not necessarily the case. It is also possible for the tinted region 6 to protrude beyond the functional element 5 or, conversely, for the functional element to protrude beyond the tinted region 6. In the latter case, the entire functional element 5 would not be connected to the outer pane 1 via the tinted region 6.

The controllable functional element 5 is a multilayer film consisting of an active layer 11 between two surface electrodes 12, 13 and two carrier films 14, 15. The active layer 11 includes a polymer matrix with liquid crystals dispersed therein, which orient themselves as a function of the electrical voltage applied on the surface electrodes, by which means the optical properties can be controlled. The carrier films 14, 15 are made of PET and have a thickness of, for example, 0.125 mm. The carrier films 14, 15 are provided with a coating of ITO facing the active layer 11 with a thickness of approx. 100 nm, which form the electrodes 12, 13. The electrodes 12, 13 can be connected to the vehicle's onboard electrical system via busbars (not shown) (formed, for example, by a silver-containing screen print) and connection cables (not shown).

The windshield has, as is customary, a circumferentially peripheral masking print 9 that is formed by an opaque enamel on the interior-side surfaces (facing the interior of the vehicle in the installation position) of the outer pane 1 and of the inner pane 2. The distance of the functional element 5 from the upper edge D and the side edges of the windshield is less than the width of the masking print 9 such that the side edges of the functional element 5—with the exception of the side edge pointed toward the central field of vision B—are covered by the masking print 9. The electrical connections (not shown) are also expediently applied in the region of the masking print 9 and thus concealed.

Analogously to FIG. 3A-C, the barrier film 4 is formed in one piece and folded around one of the edges of the functional element 5 (here, the side edge 5.1, the edge of the functional element 5 directly adjacent the edge M of the composite pane 100). Here, "folded" means that the barrier film 4 is turned 180° and arranged parallel to itself. The functional element 5 is arranged in the intermediate space thus formed. On all other side edges 5.2, 5.3, 5.4 of the functional element 5, the barrier film 4 has an overhang u of, for example, 10 mm. Alternative windshields have only a small overhang in the region of the fold over of the barrier film 4 on the functional element 5 and are arranged flush with the functional element 5 on the other side edges 5.2, 5.3, 5.4. The brightening and changing of the optical properties due to aging occurring there can be covered, for example, by a masking print. The only optically visible lower side edge 5.1 of the functional element 5, on which the barrier film 4 is folded back, is however particularly protected against aging.

A so-called "high flow PVB", which has better flow behavior compared to standard PVB films, can preferably be used for the intermediate layers 3a, 3b, 3c. The layers flow around the barrier film 4 and the functional element 5 better, creating a more homogeneous visual impression, and the transition from the functional element 5 to the intermediate layer 3c is less conspicuous. The "high flow PVB" can be used for all or even for one or more of the intermediate layers 3a, 3b, 3c.

FIG. 6 depicts a plan view of another embodiment of a composite pane 100 according to the invention as a windshield with an electrically controllable sun visor. The windshield and the functional element 5 as a controllable sun visor correspond substantially to the embodiment of FIG. 5. The PDLC functional element 5 is, however, divided into six strip-like segments by horizontal isolation lines 16. The isolation lines 16 have, for example, a width of 40 µm to 50 µm and a mutual distance of 3.5 cm. They were introduced into the prefabricated multilayer film using a laser. The isolation lines 16 separate, in particular, the electrodes 12, 13 into strips isolated from one another, which have in each case a separate electrical connection. Thus, the segments are switchable independently of one another. The thinner the isolation lines 16, the less conspicuous they are. Even thinner isolation lines 16 can be realized using etching methods.

As a result of the segmentation, the height of the darkened functional element 5 can be adjusted. Thus, depending on the position of the sun, the driver can darkened the entire sun visor or even only a part thereof. The figure indicates that the upper half of the sun visor is darkened and the lower half is transparent.

In a particularly convenient embodiment, the functional element 5 is controlled by a capacitive switching surface arranged in the region of the functional element, wherein the driver specifies the degree of darkening by the location on which he touches the pane. Alternatively, the functional element 5 can also be controlled by contactless methods, for example, by detecting gestures or as a function of the state of the pupil or eyelid determined by a camera and suitable evaluation electronics.

FIG. 7 depicts an exemplary embodiment of the production method according to the invention with reference to a flowchart.

FIG. 8 depicts a prior art composite pane 100' prior art, as disclosed in FIG. 4 of WO 2014/086554 A1 and the associated description. A polyimide film is disclosed as barrier film 4' (called edge seal), which runs circumferentially around the side edges 5.1, 5.2, 5.3, 5.4 of the functional element 5. The polyimide film extends, starting from the side edges of the functional element, a few millimeters beyond the surface of the carrier films facing away from the active layer.

In the prior art, the polyimide film overlaps the functional element 5. However, there is no region in which the polyimide film has an overhang u beyond the functional element 5 and overhanging sections of the polyimide film are arranged directly adjacent one another and make contact with one another.

In the region in which there is an overhang in a composite pane according to the invention, i.e., in which the barrier films 4a, 4b according to the invention or two ends of the barrier film 4 folded around an opposite side edge contact one another, in the prior art of FIG. 8, only the polyimide film is guided tightly around the side edge. In other words, in the prior art there is no overhang according to the invention.

Since the prior art polyimide film is folded circumferentially around the entire side edge region 5.1, 5.2, 5.3, 5.4, cavities, channels, or kinks inevitably develop in the polyimide film, in particular at the corners of the functional element 5. There, the assembly has only degraded diffusion barrier properties. With the prior art assembly, this results in undesirable aging phenomena and degradation of the optical properties of the functional element, in particular in the region of the corners of the functional element.

With barrier films 4, 4a, 4b according to the invention, the barrier films 4, 4a, 4b contact one another areally and in particular over their entire surface in the region of the overhang u, i.e., in the region in which they protrude laterally beyond the functional element 5. The barrier film sections according to the invention are firmly pressed against one another there by the internal pressure in the finished laminated composite pane 100 and fixed, as a result of which hermetic sealing occurs.

This was unexpected and surprising for the person skilled in the art.

LIST OF REFERENCE CHARACTERS

1 outer pane
2 inner pane
3a first intermediate layer
3b second intermediate layer
4, 4a, 4b barrier film
4' prior art barrier film 5 functional element having electrically controllable optical properties
  5.1, 5.2, 5.3, 5.4 side edge of the functional element 5
6 tinted region of the first intermediate layer 3a
7 connection points
9 masking print
11 active layer of the functional element 5
12 surface electrode of the functional element 5
13 surface electrode of the functional element 5
14 carrier film
15 carrier film
16 isolation lines
100 composite pane
100' prior art composite pane
B central field of vision of the windshield
D upper edge of the windshield, roof edge
M lower edge of the windshield, engine edge
u, $u_1$ overhang
X-X' section line
Z enlarged region

The invention claimed is:

1. Composite pane comprising a functional element having electrically controllable optical properties, comprising:
   a stack sequence formed of an outer pane, a first intermediate layer, a second intermediate layer, and an inner pane, wherein the first and second intermediate layers contain at least one thermoplastic polymer film with at least one plasticizer, and
   a functional element having electrically controllable optical properties is arranged between the first intermediate layer and the second intermediate layer at least in sections,
wherein between the first intermediate layer and the functional element as well as between the functional element and the second intermediate layer at least one barrier film is arranged and has, at least in sections, an overhang u beyond the functional element and overhanging sections of the barrier film are arranged immediately adjacent one another and contact one another, and wherein the at least one barrier film covers the functional element completely.

2. The composite pane according to claim 1, wherein at least one barrier film is in each case arranged between the first intermediate layer and the functional element and between the second intermediate layer and the functional element, which barrier film has an all-around overhang u beyond the functional element.

3. The composite pane according to claim 1, wherein the at least one barrier film is arranged between the first intermediate layer and the functional element and between the second intermediate layer and the functional element, which barrier film is folded at least in sections around a side edge of the functional element.

4. The composite pane according to claim 3, wherein the at least one barrier film is folded around each side edge and the barrier films cover the functional element at least in sections.

5. The composite pane according to claim 3, wherein the at least one barrier film has an overhang u beyond the functional element on other side edges of the functional element.

6. The composite pane according to claim 1, wherein at least one of the first and second intermediate layers contains at least 3 wt.-% of a plasticizer and the plasticizer contains or consists of aliphatic diesters of tri- or tetraethylene glycol.

7. The composite pane according to claim 1, wherein at least one of the first and second intermediate layers contains at least 60 wt.-% polyvinyl butyral (PVB).

8. The composite pane according to claim 1, wherein the functional element is a polymer-dispersed liquid crystal (PDLC) film.

9. The composite pane according to claim 1, wherein the barrier film is implemented such that the barrier film prevents the diffusion of plasticizer through the barrier film.

10. The composite pane according to claim 1, wherein the barrier film is low in plasticizer or free of plasticizer and contains or consists of polyethylene terephthalate or polyvinyl fluoride.

11. The composite pane according to claim 1, wherein the overhang u of the barrier film beyond the functional element is at least 0.5 mm.

12. The composite pane according to claim 1, wherein the overhang u of the barrier film beyond the functional element is less than 50 mm.

13. The composite pane according to claim 1, wherein the at least one barrier film includes first and second barrier films are joined to one another at least in sections in the region of the overhang u.

14. The composite pane according to claim 1, wherein the at least one barrier film includes first and second barrier films having the functional element and are joined to one another over their entire surface in the region of the overhang u.

15. The composite pane according to claim 1, wherein the functional element and the barrier film are circumferentially surrounded by a third intermediate layer.

16. Method for producing a composite pane according to claim 1, comprising
   a) arranging one outer pane, one first intermediate layer, one functional element having electrically controllable optical properties, one second intermediate layer, and one inner pane one atop another in this order, wherein at least one barrier film is arranged between the functional element and the first and second intermediate layers, the at least one barrier film covering the functional element completely, and
   b) joining the outer pane and the inner pane by lamination, wherein an intermediate layer with an embedded functional element is formed from the first intermediate layer and the second intermediate layer.

17. The method according to claim 16, wherein before step a), a first barrier film and the first intermediate layer and/or a second barrier film and the second intermediate layer are glued to one another.

18. The method according to claim 16, wherein in step a), a third intermediate layer that surrounds the functional element is arranged between the first intermediate layer and the second intermediate layer.

19. A method comprising utilizing a composite pane according to claim 1 as a windshield or roof panel of a vehicle and the electrically controllable functional element as a sun visor.

20. A method comprising utilizing a composite pane having an electrically controllable functional element according to claim 1 as interior glazing or exterior glazing in a vehicle or a building and the electrically controllable functional element as a sun screen or as a privacy screen.

* * * * *